US008861527B1

(12) United States Patent
Bao et al.

(10) Patent No.: US 8,861,527 B1
(45) Date of Patent: Oct. 14, 2014

(54) NETWORK-ASSISTED ROUTING FOR TOPOLOGY-AWARE OVERLAY NETWORKS

(75) Inventors: Qi Bao, Boxborough, MA (US); Feng Zhang, Sherborn, MA (US); Qin Xin, Broken Arrow, OK (US)

(73) Assignee: EMC Corporation, Hopkinton, MA (US)

( * ) Notice: Subject to any disclaimer, the term of this patent is extended or adjusted under 35 U.S.C. 154(b) by 248 days.

(21) Appl. No.: 13/407,980

(22) Filed: Feb. 29, 2012

Related U.S. Application Data

(60) Provisional application No. 61/582,108, filed on Dec. 30, 2011.

(51) Int. Cl.
H04L 12/46 (2006.01)
H04L 12/18 (2006.01)
H04W 8/08 (2009.01)
H04L 12/715 (2013.01)

(52) U.S. Cl.
CPC ........ H04L 12/1836 (2013.01); H04L 12/4633 (2013.01); H04W 8/085 (2013.01); H04L 45/64 (2013.01)
USPC ........................................................ 370/392

(58) Field of Classification Search
CPC ......... H04L 45/00; H04L 45/16; H04L 45/02; H04L 45/021; H04L 45/04; H04L 45/50; H04L 45/64; H04L 12/1836; H04L 12/4633; H04L 67/1095; H04W 40/02; H04W 8/085; H04W 80/04
USPC ........................................................ 370/392
See application file for complete search history.

(56) References Cited

U.S. PATENT DOCUMENTS

| 6,351,775 | B1* | 2/2002 | Yu ................................... 709/238 |
| 7,242,671 | B2* | 7/2007 | Li et al. ........................... 370/254 |
| 8,095,601 | B2* | 1/2012 | Hasha et al. ................... 709/206 |
| 8,549,180 | B2* | 10/2013 | Critchley et al. ............. 709/251 |
| 2007/0028002 | A1* | 2/2007 | McCanne ....................... 709/238 |
| 2008/0008202 | A1* | 1/2008 | Terrell et al. ................... 370/401 |

(Continued)

OTHER PUBLICATIONS

Aguilera et al., "Using Erasure Codes Efficiently for Storage in a Distributed Aystem", Proc. of the 2005 Int. Conf. on Dependable Systems and Networks (DSN'05), IEEE Computer Society, 2005.

(Continued)

*Primary Examiner* — Jeffrey M Rutkowski
*Assistant Examiner* — Rasha Fayed
(74) *Attorney, Agent, or Firm* — Bainwood Huang

(57) ABSTRACT

An overlay network has a hierarchical cluster tree (HCT) structure on an underlying physical network, the HCT structure having clusters of local area networks (LANs) associated with respective sub-spaces of a hash key space. A cluster proxy node (CP) maintains a routing table and channels to both a parent cluster and member LANs, with routing information associating each LAN with a physical-network address (PA) of a corresponding LAN representative node (LR). Nodes sending routing request messages each containing a key value to the CP node, which returns routing response messages each including PA information from the routing table and/or the parent cluster. The PA information in the response for a given request includes a PA of an LR of a request-specific LAN whose sub-space contains the key value in the request message. A node uses the PA information to send a message to the LR node using the physical network.

20 Claims, 7 Drawing Sheets

(56) References Cited

U.S. PATENT DOCUMENTS

| | | | | |
|---|---|---|---|---|
| 2009/0089300 A1* | 4/2009 | Vicente | ......................... | 707/100 |
| 2009/0207840 A1* | 8/2009 | McCanne | ...................... | 370/390 |
| 2011/0271007 A1* | 11/2011 | Wang et al. | ................... | 709/238 |
| 2013/0034031 A1* | 2/2013 | Sherman et al. | .............. | 370/310 |

OTHER PUBLICATIONS

Castro et al., "Topology-Aware Routing in Structured Peer-to-Peer Overlay Networks", A. Schiper et al. (Eds.), Future Directions in DC 2002, pp. 103-107, 2003.

Chang et al., "Bigtable: A Distributed Storage System for Structured Data", ACM. Trans. Comput. Syst. 26, 2, Article 4, Jun. 2008.

DeCandia et al., "Dynamo: Amazon's Highly Available Key-Value Store", SOSP'07, Oct. 14-17, 2007, Stevenson, Washington.

Dabek et al., "Designing a DHT for Low Latency and High Throughput", NSDI'04 Technical Paper, retrieved from http://static.usenix.org/events/nsdi04/tech/full_papers/dabek/dabek_html/ on Jul. 19, 2012.

Dabek et al., "Vivaldi: A Decentralized Network Coordinate System", SIGCOMM'04, Aug. 30-Sep. 3, 2004, Portland, Oregon.

Goodson et al., "Efficient Byzantine-Tolerant Erasure-Coded Storage", Proc. of the 2004 Int. Conference on Dependable Systems and Networks (DSN'04), IEEE Computer Society, 2004.

Greenan et al., "Reliability of XOR Based Erasure Codes on Heterogeneous Devices", International Conference on Dependable Systems and Networks, Anchorage, AK, pp. 147-156, Jun. 24-27, 2008.

Greenan, "Reliability and Power-Efficiency in Erasure-Coded Storage Systems", Technical Report UCSC-SSRC-09-08, University of California, Santa Cruz, Dec. 2009.

Hafner et al., "Notes on Reliability Models for Non-MDS Erasure Codes", IBM report, 2006.

Lakshman et al., "Cassandra—A Decentralized Structured Storage System", ACM SIGOPS Operating Systems Review, vol. 44, Issue 2, pp. 35-40, Apr. 2010.

Prasad et al. "Bandwidth Estimation: Metrics, Measurement Techniques, and Tools", IEEE Network, vol. 17, Issue 6, pp. 27-35, Nov./Dec. 2003.

Ratnasamy et al., "A Scalable Content-Addressable Network", SIGCOMM01, Aug. 27-31, 2001, San Diego, CA.

Ratnasamy et al., "Topologically-Aware Overlay Construction and Server Selection", INFOCOM2002, 21st Annual Joint Conf. of the IEEE Comp. and Com. Societies, pp. 1190-1199, 2002.

Rowstron et al., "Pastry: Scalable, Distributed Object Location and Routing for Large-Scale Peer-to-Peer Systems", R. Guerraoui (Ed.), Middleware 2001, pp. 329-350, 2001.

Stoica et al., "Chord: A Scalable Peer-to-Peer Lookup Service for Internet Applications", SIGCOMM'01, Aug. 27-31, 2001, San Diego, CA.

Weatherspoon, Hakim, "Design and Evaluation of Distributed Wide-Area On-line Archival Storage Systems", Appears in University of California, Berkeley PhD Dissertation, Technical Report No. UCB/EECS-2006-130, Oct. 13, 2006.

Weil et al., "CRUSH: Controlled, Scalable, Decentralized Placement of Replicated Data", SC2006, Nov. 2006, Tampa, FL.

* cited by examiner

NETWORK-ASSISTED ROUTING FOR TOPOLOGY-AWARE OVERLAY NETWORKS

CROSS REFERENCE TO RELATED APPLICATIONS

This Patent Application claims benefit under 35 U.S.C. §119(e) of U.S. Provisional Patent Application No. 61/582,108 filed on Dec. 30, 2011 and entitled "TECHNIQUES FOR NETWORK-ASSISTED ROUTING FOR TOPOLOGY-AWARE IP OVERLAY NETWORKS", the contents and teachings of which are hereby incorporated by reference in their entirety.

BACKGROUND

The present invention is related to the field of overlay networks, and more particularly to routing-related operation of overlay networks.

In an overlay network, routing is required to locate a node or a group of nodes (e.g. a LAN) that are responsible for a portion of a "key space" used to distribute data among the nodes of the overlay network. Existing routing approaches in overlay networks rely on logical relationships in the overlay network. For example, a hash key calculated from data or metadata may be used as the basis of routing decisions. To locate a node or group of nodes that are responsible for a particular hash key (also referred to herein as "key" or "key value"), the routing process may compare the hash key with hashes of logical node identifiers, which in general provide no information about connections or other relationships among the nodes in the underlying physical network. The lack of such information may lead to non-optimal data placement and network operation. These kinds of overlay networks may be termed "topology unaware".

Certain improvements in overlay network design may better align hash key space with physical network topology, but still rely on the abstract key space as the main factor in routing decisions. There are several disadvantages of these approaches. For example, logical key space cannot be accurately aligned with physical network topology; therefore there is always the issue of logical space mismatch with physical network topology, resulting in long routing delays. Additionally, as the network size increases, the logical space is further divided into smaller regions, and the routing process will take more steps and therefore introduce longer delays.

SUMMARY

Methods and apparatus are disclosed that provide network-assisted routing in a topology-aware overlay network. In particular, the disclosed techniques are usable in a particular type of overlay network referred to as a "hierarchical cluster tree" or HCT overlay network, which is structured to include two or more successively higher levels of "clusters" (groupings) of network nodes, and in which the basic unit of clustering and routing is a local-area network (LAN). The disclosed techniques provide for distributed maintenance, updating, and use of routing information to enable member nodes of the overlay network to exchange messages.

In one respect, a disclosed method involves operation of a special node termed a "cluster proxy" or CP node in each cluster. Among other things, the CP node serves as a contact point for routing information. In this respect, the method includes becoming established as a cluster proxy node of a cluster in the HCT overlay network. As mentioned, the HCT overlay network includes two or more successively higher levels of clusters of local area networks (LANs), and each cluster at a given level includes a respective subset of the LANs as member LANs separated from each other by no more than a respective level-specific distance in the physical network. The LANs are uniquely associated with corresponding sub-spaces of a key space defined in the overlay network.

The CP node maintains a routing table and respective channels to a parent cluster and one or more member LANs of the cluster, where the routing table and channel to the parent cluster serve as sources of routing information for reaching the LANs of the overlay network. The routing information associates each LAN with a physical-network address of a corresponding LAN representative (LR) node of the LAN, which is a node within a LAN that represents all the nodes in that LAN in communications pertaining to clustering and other overlay-network operations. The routing table includes at least that portion of the routing information that associates each member LAN of the CP node's cluster with the physical-network address of a corresponding LAN representative node.

To obtain routing information, nodes of the member LANs of the cluster send routing request messages to the CP node, each routing request message including a respective key value from the key space of the overlay network. In response to receiving the routing request messages, the CP node returns corresponding routing response messages each including physical-network address information from the routing table and/or the parent cluster. The physical-network address information of each routing response message includes a physical-network address of a LAN representative node of the LAN whose associated sub-space contains the key value included in the corresponding routing request message. The physical-network address information can be used by a requesting node to send a message to the LR node of that LAN using the underlying physical network. In one embodiment, an initial message to the LR node might be a request for node-level routing information about the nodes of the LAN, enabling the requesting node to send a message (such as a data storing or reading message) to a specific node of the LAN.

The improved techniques may have certain advantages over existing solutions, including (A) use of hierarchical routing table structure that reflects physical network topology. With this routing table structure, the routing process closely follows the physical network topology, reducing routing delay. In addition, the tree structure promotes efficiency. A routing operation may involve on the order of (log N) steps where N is the total number LANs in the system. Another advantage is (B) better scalability. The disclosed method makes routing decisions based on physical network topology, and may thus be more scalable because network topology changes slower than logical hash key space. Another advantage is (C) better stability, because the network topology is less affected by a single node failure than is a logical key space.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
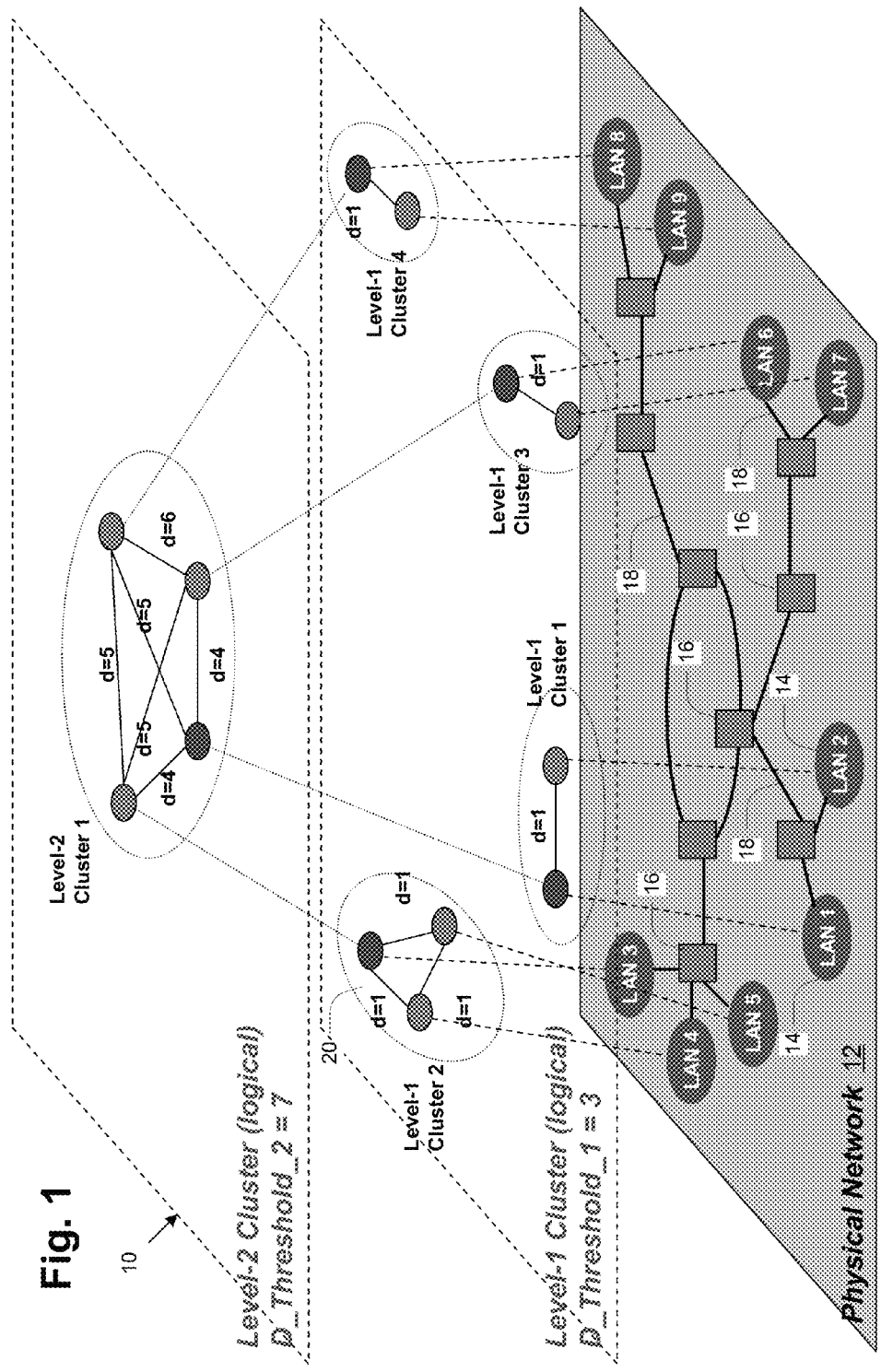
FIG. 1 is a schematic block diagram of an overlay network.

FIG. 1 shows a simplified example overlay network 10 including components of a physical network 12 having a hierarchical cluster tree (HCT) configuration. In this example the HCT configuration establishes clusters at two logical levels shown as Level-1 and Level-2. The physical network is shown as including nine local-areas networks (LANs) 14 identified as LAN 1 through LAN 9, along with routers 16 and links 18 that connect each router 16 to either a LAN 14 or to another router 16. For sake of clarity, reference numbers for some of these components are omitted, but it will be understood that LANs 14, routers 16 and links 18 are indicated in FIG. 1 by ovals, squares and thickened line segments respectively.

Although not shown in FIG. 1, each LAN 14 includes one or more physical computerized devices as overlay network nodes each operative to perform data processing and storage operations. Additional details are provided below.

The clustering of LANs 14 is indicated for each of the two levels. Thus LAN 3, LAN 4 and LAN 5 form a Level-1 cluster 20 identified as Level-1 Cluster 2, for example. Within the depiction of each Level-1 cluster are ovals representing corresponding LANs 14, as well as line segments used to indicate a "distance" d between each pair of LANs 14. In the illustrated example, distance is measured in units referred to as "hops", which refers to the number of routers 14 along a shortest path between the pair of LANs 14. Again referring to the cluster 20 and its underlying physical-network components, the path between any LAN 14 and another LAN 14 in the cluster 20 is through one router 16, and thus the distance values are each shown as 1 (d=1). Additional details regarding the makeup of the clusters and how distance is measured are provided below.

It is noted that the Level-2 cluster (Level-2 Cluster 1) includes all the LANs that are members of the member (or "child") Level-1 clusters, but for simplicity in FIG. 1 only one LAN from each Level-1 cluster is shown. For many operations, each cluster is represented by a single node referred to as a "cluster proxy" or CP residing in one of the LANs of the cluster. Additional description regarding cluster proxies is given below. In FIG. 1, the LANs shown in Level-2 Cluster 1 are understood to be respective LANs of the underlying Level-1 clusters in which the CPs of those underlying clusters reside.

Each level of the overlay network 10 is associated with a respective threshold d_threshold that establishes the maximum "size" of the clusters at that level. At level 1, "size" refers to the largest inter-LAN distance in the cluster, whereas at higher levels size is the maximum distance between any two child clusters of the cluster (measured using "medoid nodes" described below). In the illustrated example, the threshold values for level 1 and level 2 are three (3) and seven (7) respectively. Thus the inter-LAN distances in Level-1 clusters are constrained to be no more than 3. FIG. 1 shows four clusters at level 1, each having a maximum inter-LAN distance of 1 which satisfies the Level-1 distance criteria (3). Also in this example, the distance between a LAN in any given Level-1 cluster and a LAN in another Level-1 cluster is no more than 7. For example, the distance between LAN 1 (in Level-1 Cluster 1) and LAN 5 (in Level-1 Cluster 2) is 4, i.e., the shortest path between these two LANs traverses four routers 16. All these distances satisfy the Level-2 distance threshold of 7, and thus all the LANs are members of Level-2 Cluster 1.

The remaining description employs particular terminology for functional components, organization, data, etc. In the interest of clarity, the following presents a description of this terminology:

Network Distance: hop count between two LANs, i.e. number of layer-3 (physical network layer) routers/switches on the path between two LANs;

LAN Representative (LR) node: a node within a LAN that represents other nodes in the same LAN to communicate with nodes outside the LAN in clustering and other overlay network processes;

Level-1 Cluster: a collection of LANs that meet certain network metrics constraints (e.g., distance measured by hop count) among themselves at a lowest hierarchical level of the hierarchical cluster tree (HCT) overlay network;

Level-n Cluster: a collection of Level-(n−1) clusters that meet certain network metrics constraints amongst themselves, where n>=2;

Cluster Proxy (CP) node: the LR node of a member LAN of a cluster that is the point of contact for overlay-network communication with nodes in other clusters;

Cluster Medoid (CM): For a cluster, the cluster medoid is the member or "child" cluster having the smallest network distance to all other child clusters. In FIG. 1, the CM for Level 2 Cluster 1 is Level 1 Cluster 1.

Cluster Medoid (CM) node: LR node of the Cluster Medoid;

Cluster Radius: average network distance from the Cluster Medoid to all other child clusters;

Cluster Diameter: largest network distance between any two child clusters;

Registration Server (RS): a server with a public known name for purposes of registration, authentication, authorization, and accounting;

LAN ID: a sequence number assigned by the RS to a new LAN when the LAN first joins the overlay network;

Cluster ID: A unique identifier for each cluster, potentially corresponding to the relative position of the cluster in the cluster tree. Examples discussed below.

Figure 2:
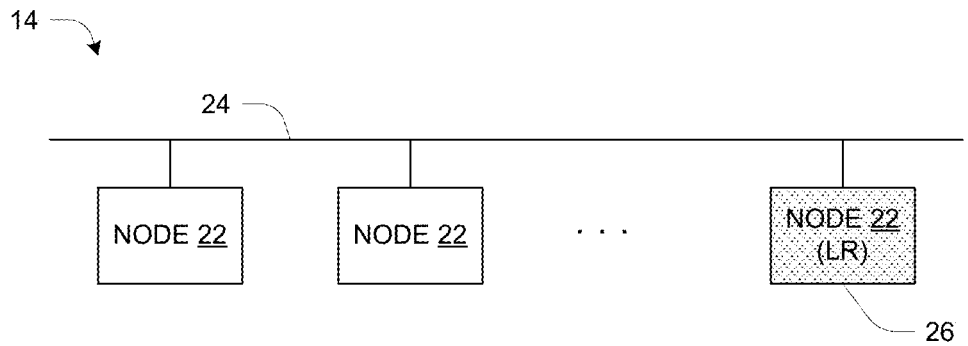
FIG. 2 is a block diagram of a local-area network (LAN)

FIG. 2 illustrates the structure of a LAN 14. It is shown as a collection of one or more network nodes (nodes) 22 interconnected by a network segment 24. The structure of a node 22 is described below. The network segment 24 represents a layer-2 or data-link layer network, which may be physically realized in a variety of ways. For example, it may be realized using one or more layer-2 switches that interconnect the nodes 22. A LAN 14 is typically a "broadcast domain" for purposes of certain networking protocols, such as Address Resolution Protocol or ARP for example. A LAN 14 is a self-contained network whose structure and function may be largely hidden from the wider-area internetwork that couples multiple LANs 14 together. A central router 16 (FIG. 1) may know that a node 22 is reachable via a particular peripheral router 16 and can forward messages toward the peripheral router 16 at a network layer of operation, but the detailed operations by which a peripheral router 16 locally forwards the message to an endpoint node 22 of a LAN 14 are local operations distinct from the network layer of operation. In many cases a LAN 14 employs Ethernet technologies, for example, having distinct message formats ("frames") and a specification of underlying physical link characteristics (data rates, signaling requirements, etc.).

As shown in FIG. 2, one node 22 serves a special role and is referred to as a LAN Representative or LR node 26. As defined above, an LR node 26 is the node within a LAN 14 that represents all the nodes 22 in that LAN 14 in communications pertaining to clustering and other overlay-network operations within the overlay network 10. Specific examples are given below.

Referring back to FIG. 1, one LAN 14 in each cluster has a darker shading to indicate its status as containing the Cluster Medoid node, which as defined above is the LR node 26 of a member LAN 14 of the cluster that has the smallest average network distance to all other LR nodes 26 of same the cluster. Such a LAN 14 may be referred to as the CM LAN. This status is most apparent in Level-2 Cluster 1, which identifies LAN 1 as the CM LAN. LAN 1 has an average distance of 4.3 to the other LANs 14 of Level-2 Cluster 1, while each other LAN in that cluster has a higher average distance to the other LANs.

The purpose of clustering is to group nodes that are closer to each other in terms of network distance, which in turn is useful for a variety of purposes such as routing, data placement and other purposes as described below. The basic clustering unit is a LAN 14. To be able to represent a large scale network, a cluster level hierarchy is used, with levels extending from 1 to N where N is greater than or equal to 2.

A level-1 cluster consists of multiple LANs 14 such that network distance between any pair of LANs is less than or equal to a level-1 threshold parameter, d_threshold_1. The network distance is measured between the respective LR nodes 26 of the LANs 14. In one embodiment the distance is measured as "hop count", or the number of network-layer routers (e.g., IP routers) along a shortest path between the two LR nodes 26.

A level-n cluster (for all n greater than or equal to 2) consists of multiple level-(n−1) clusters such that network distance between any pair of level-(n−1) clusters is less than or equal to a threshold parameter d_threshold_n. The network distance is measured between the respective CM nodes of each pair of clusters. Generally, d_threshold_n is greater than d_threshold_(n−1). For example, in some embodiments each d_threshold_n may be equal to 2*d_threshold_(n−1)+1.

With such a hierarchical cluster tree structure, a large scale network can be fairly accurately represented. Another advantage of such a hierarchical structure is that the cluster tree is flexible and can grow with the size of the system.

A cluster keeps track of lower level cluster member information as well as upper level parent information in order to maintain the cluster hierarchical tree. A cluster has a Cluster Information Table that lists cluster parameters for itself, a Member Table that lists all its lower level cluster information, and a Peer Table that lists network metrics between peer clusters at the same level as this cluster and also being under the same parent cluster. Table 1 shows contents of the Cluster Information Table, including cluster ID, proxy node information, current medoid node information, current cluster radius, current cluster diameter, current parent cluster information, and number of current child clusters.

TABLE 1

Cluster Information Table

| Cluster ID | Proxy Node Address | Medoid Node Address | Radius | Diameter | Cluster Level | Parent Cluster ID | Parent Proxy ID | Distance to Parent | BW to the Parent | Number of Child Clusters |
|---|---|---|---|---|---|---|---|---|---|---|

TABLE 2

Cluster Member Table

| Child Cluster ID | Proxy Node Address | Distance to the Child Cluster | BW to the Child Cluster | Status Flag (Active/Down) |
|---|---|---|---|---|

TABLE 3

Peer Table

| Peer Cluster ID | Proxy Node Address | Distance to the Peer Cluster | BW to the Child Cluster | Status Flag (Active/Down) |
|---|---|---|---|---|

As mentioned above, the Cluster ID may reflect the position of the cluster in the cluster tree. As an example for a two level cluster tree, the tree root cluster (level-2) could have a cluster ID of 0x0100, while its child clusters (level 1) could have cluster IDs of 0x0101, 0x0102, 0x0103, etc.

Part of the processes of establishing and maintaining clusters is the regular exchange of status messages among the LR nodes of the LANs of the cluster. In a level 1 cluster, the LR node 26 of each member LAN 14 will periodically transmit a Status message to the Cluster Proxy (CP) node of the cluster. When the CP node receives a Status Message from an LR node, the CP node will also send back a Status message to update the LR 26 of other member LANs 14. This kind of handshake Status message can enable the CP node to detect a LAN failure, as well as enable an LR node 26 to detect the CP node failure.

Similar to level 1 cluster, at higher level clusters, Status messages are periodically exchanged between the CP node of the cluster and CP nodes of member clusters with one level lower. These Status message can be used to update routing information in the cluster hierarchical tree. It may be desirable to use successively longer intervals for exchanging status messages at different hierarchical levels, to promote "bottom-up" updating of network cluster structure and information.

As indicated above, each cluster is represented by a Cluster Proxy or CP node. It is necessary for a new CP to become established during initial cluster formation as well as in the event of failure of a CP node. This can be done in a distributed manner among the LR nodes of the cluster. The process at each LR node of a cluster is generally as follows:

1. Check the Cluster Member table and compare member LAN's LAN IDs;
2. If this node's LAN ID is the lowest
3. {
4. Declare itself to be the new CP node of the cluster;
5. Send a Status message to all member LANs on the cluster's Member Table;
6. } else
7. {
8. Send a Status message to the lowest ID LAN's LR node;
9. Request the lowest LAN to be the new CP LAN;

A CP node plays a special role in routing related operation, as described further below.

Figure 3:
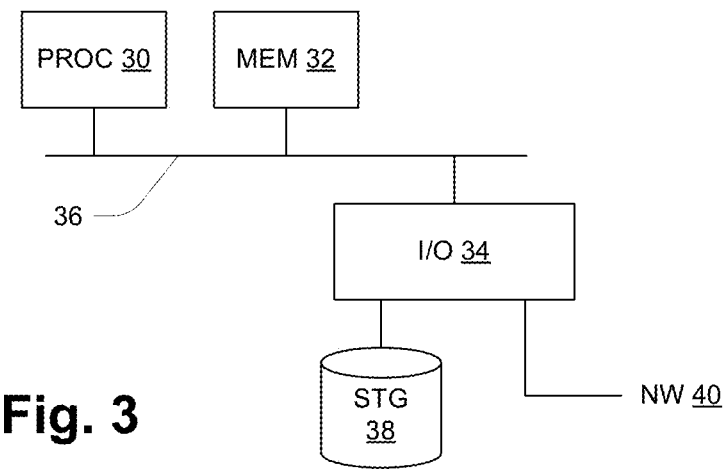
FIG. 3 is a block diagram of a computerized device forming part or all of a network node.

FIG. 3 shows a hardware organization of a node 22, which is a computerized device generally including instruction processing circuitry (PROC) 30, memory 32, input/output circuitry (I/O) 34, and one or more data buses 36 providing high-speed data connections among these components. The I/O circuitry 34 typically has connections to at least a local storage device (STG) 38 as well as a network segment (NW) 40 of the LAN 14 in which the node 22 resides. In operation, the memory 32 includes sets of computer program instructions generally referred to as "programs" or "routines" as known in the art, and these sets of instructions are executed by the processing circuitry 30 to cause the node 22 to perform certain functions as described herein. It will be appreciated, for example, that in a typical case the functions described herein related to structure and functioning of the overlay network 10 are realized by corresponding programs executing at the nodes 22. Further, the programs may be included in a computer program product which includes a non-transitory computer readable medium storing a set of instructions which, when carried out by a set of nodes 22, cause the nodes 22 to perform the methods described herein. Non-limiting examples of such non-transitory computer readable media include magnetic disk or other magnetic data storage media, optical disk or other optical data storage media, non-volatile semiconductor memory such as flash-programmable read-only memory, etc.

Figure 4:
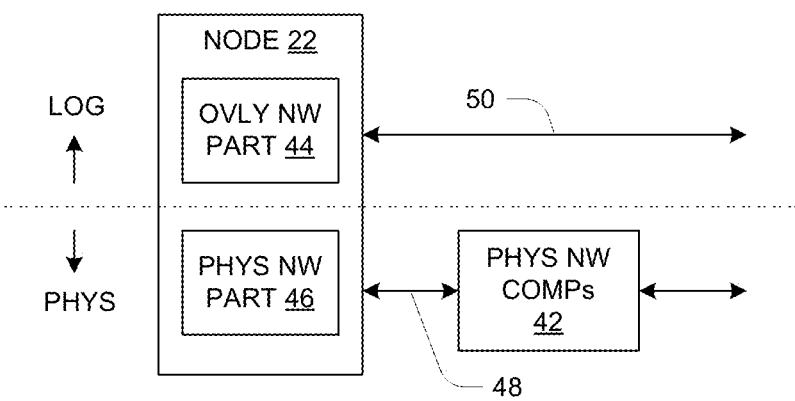
FIG. 4 is a schematic depiction of separate layers of functionality of a node.

FIG. 4 shows a logical/physical distinction used for certain descriptive purposes herein. Overall network structure is shown as divided between logical (LOG) and underlying physical (PHYS) layers, where the physical layer includes infrastructure and protocol elements of the physical network and the logical layer includes higher-level components defining an overlying logical network. The physical-network infrastructure generally includes physical-network components 42 below layer 4 in the 7-layer network model, such as Ethernet cables and transceivers, media access controllers, switches, routers, etc. These provide physical-network data communications services to the overlying logical network. A node 22 can be viewed as having two parts, a physical-network part (PHYS NW) 44 and an overlay-network part (OVLY NW) 46 as shown in FIG. 4. The physical-network part 44 has physical-network connections 48 to the physical-network components 42 (e.g., Ethernet links and TCP/IP sessions, for example), while the overlay part 44 has logical connections 50 to the respective overlay parts 44 of other nodes 22 in the overlay network 10. The logical connections 50 are carried by the physical-network connections 48 and physical-network components 42. The physical-network part 46 of a node 22 provides physical-network services (such as transmission and reception of inter-node messages) to the overlay part 44 of the same node 22.

In the remaining description, a reference to a node 22 is to be understood as a reference to either the physical-network part 46 or to the overlay part 44 operating in conjunction with the physical-network part 46, as should be clear in context. Functions and communications pertaining to clustering, for example, involve primarily the overlay part 44, using the underlying physical-network part 42 merely as a message transport mechanism to communicate with the overlay part 44 of other nodes 22. Another set of functions and communications is referred to as "routing", i.e., operations for enabling or facilitating the exchange of messages among the overlay parts 44 of the nodes 22 of the network 10. This logical-layer routing is distinct from routing operations of the physical network 12 using network-layer protocols such as the Internet Protocol (IP) etc. as commonly known in the art. Logical-layer routing is performed among the overlay parts 44 of the nodes 22 using abstract node and LAN identifiers as described below, while physical-layer routing is performed among the physical parts 46 and uses physical-network addresses such as IP addresses and Ethernet media access control (MAC) addresses for example.

In some embodiments, another aspect of the logical layer of network operation is the use of a so-called "distributed hash table" or DHT structure for distributing data items in the overlay network 10. A DHT structure can be used to realize a distributed database such as a file system, for example. A given DHT scheme employs a specific hash function that defines a number space, called a key space, of hash values. Ranges of hash values (forming sub-spaces of the hash key space) are mapped or assigned to corresponding network nodes where data items associated with the sub-spaces are stored. Each data item has a corresponding hash value according to the hash function, for example by applying the hash function to the data item or associated metadata (e.g., calculating a hash value by evaluating the hash function with the data contents or file name of the data item as input). The hash function is generally chosen so that the probability of a "collision" (different data items mapping to the same hash value) is acceptably low. A data item can be stored or retrieved by calculating its hash value, identifying the node responsible for the sub-space that contains the calculated hash value (using some predefined mapping function), then storing or retrieving the data to/from the identified node and/or related nodes. To facilitate read-type operations, for which the accessing node does not have the contents of the data item, the DHT scheme may employ metadata unique to the data item to calculate the hash value. An example of such uniquely identifying metadata might be a fully qualified file name of a file in a file system. Having such a file name, a node can identify the location of the data item by applying the hash function to it and then performing a matching function, as described below with reference to FIG. 8.

Figure 5:
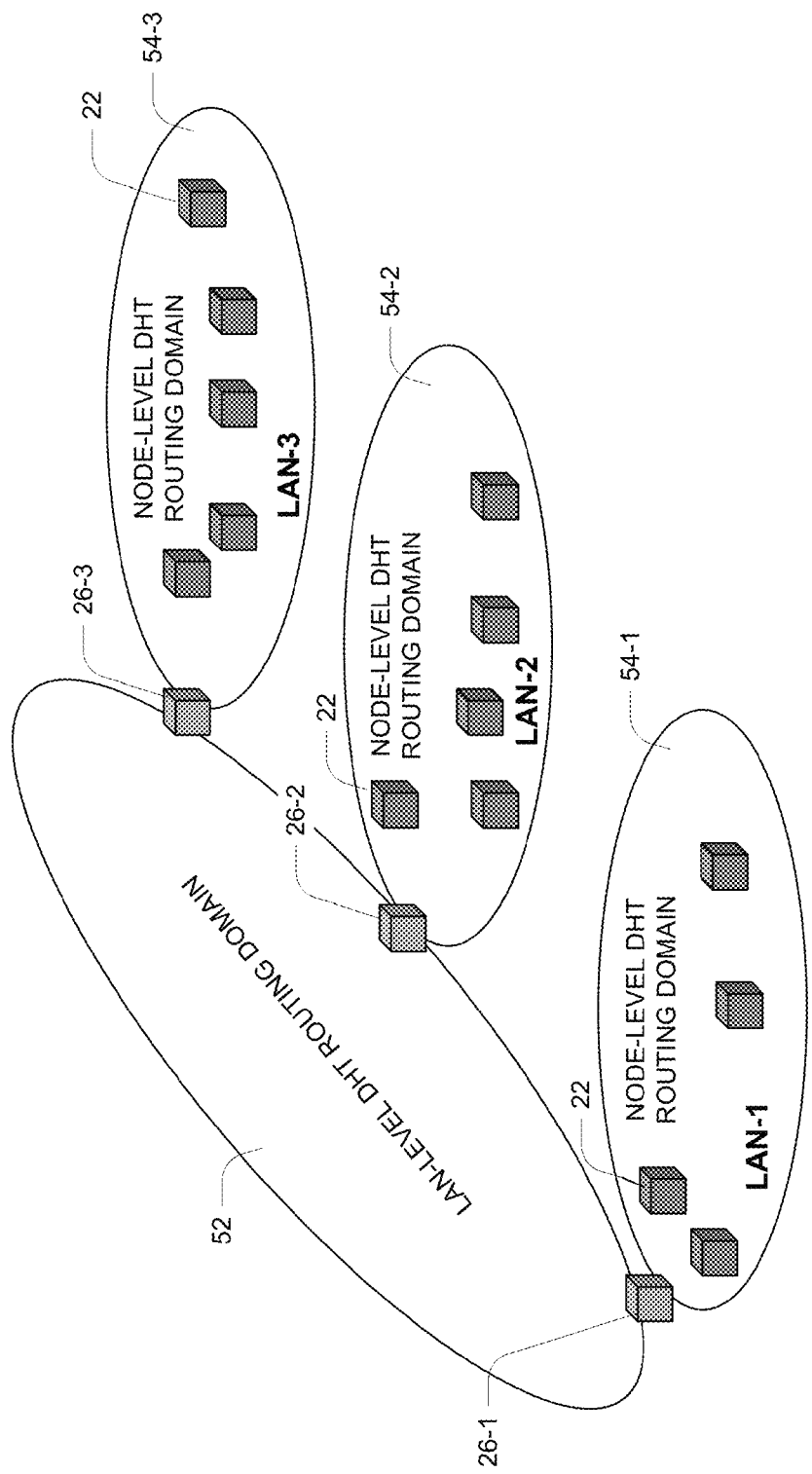
FIG. 5 is a schematic description of a two-level distributed hash table (DHT) routing scheme.

FIG. 5 illustrates a DHT scheme in which the hash space is divided into two separate and distinct parts or layers: a LAN layer at a level of LANs 14, and a node layer at a level of nodes 22 within each LAN 14 (one node 22 serving as an LR 26). These two layers are indicated in FIG. 5 by a LAN level DHT routing domain 42 and Node-level DHT routing domains 44 (shown as 44-1 through 44-3 for respective LANs LAN-1, LAN-2 and LAN-3). In operation, two different hash values are used to map a data item to a node 22—a first hash value that maps the data to a LAN 14, and a second hash value that maps the data to a node 22 within that LAN 14. The hash values, which may be referred to as the "LAN hash" and the "node hash" respectively, may be calculated using different hash functions, or they may be calculated using the same hash function but operating on different parts of the data. The hash values are preferably highly independent of each other to promote even usage of nodes within each LAN (node selection independent of LAN selection). A two-level structure such as depicted in FIG. 5 has the benefit of more efficient scalability to large networks than provided by a one-level structure. Two levels greatly reduces the LAN level DHT size, and each LAN typically has a small size (e.g. <256 nodes). Thus a two level scheme can improve scalability because the number of LANs is much smaller than total number of nodes, and in each LAN the number of nodes is typically small.

Figure 6:
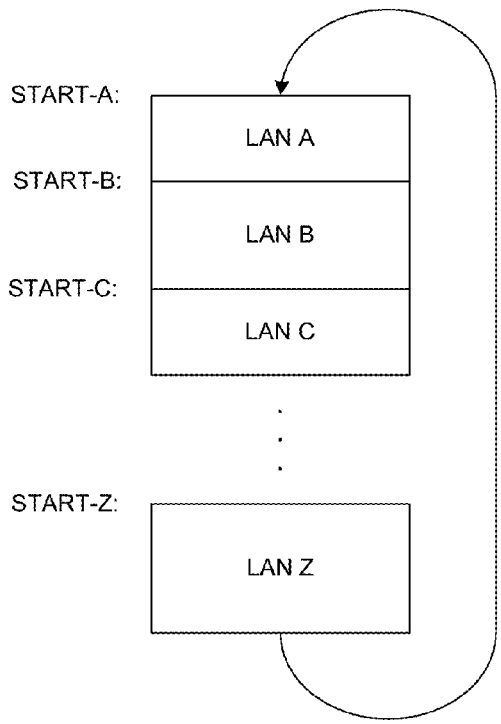
FIGS. 6 and 7 are schematic depictions of orderings of LANs and nodes.
Figure 7:
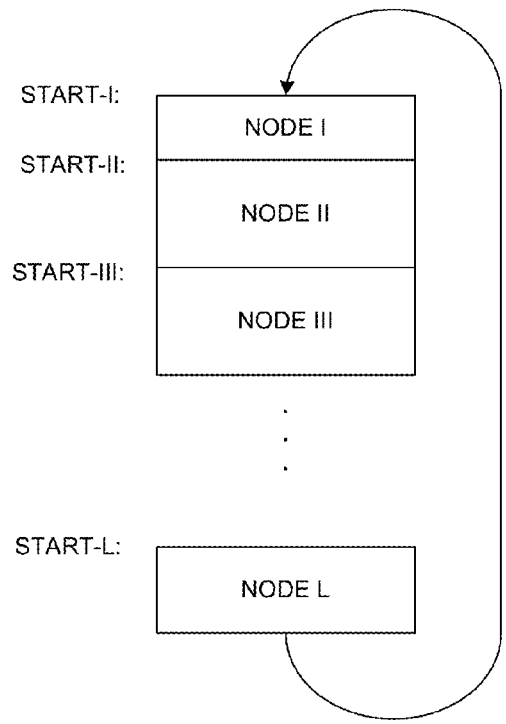

FIGS. 6 and 7 illustrate partitioning of DHT keyspace among LANs 14 and nodes 22. In FIG. 6, each LAN (A, B, . . . ) is associated with a respective starting hash value (START-A, START-B, . . . ), and the set of values is ordered in a predetermined manner (e.g., by increasing value). Each LAN is assigned responsibility for a respective sub-space of hash values in a range between successive starting hash values (with a wrap-around at the end as shown). FIG. 7 shows a similar arrangement for the nodes 22 of a LAN 14. The subspaces need not be of the same size, and indeed it may be preferable to allow for size variation to more easily accommodate dynamic behavior in which LANs and/or nodes become available or become unavailable during operation.

A simplified example is given to illustrate the structuring shown in FIGS. 6 and 7. Imagine that a given overlay network 10 has 16 LANs and each LAN has up to 32 nodes. Further, the hash values at each level are 16-bit integers. One set of mappings that may be used is as follows (hash values shown in hexadecimal):

| LAN Hash Value (LAN key) Range | LAN # | Node Hash Value (Node key) Range | Node # |
|---|---|---|---|
| 0000-0FFF | 1 | 0000-07FF | 1 |
| 1000-1FFF | 2 | 0800-0FFF | 2 |
| . . . | . . . | . . . | . . . |
| F000-FFFF | 16 | F800-FFFF | 32 |

In the above example, the lowest number in each range is the corresponding START value from FIG. 6 or 7.

Figure 8:
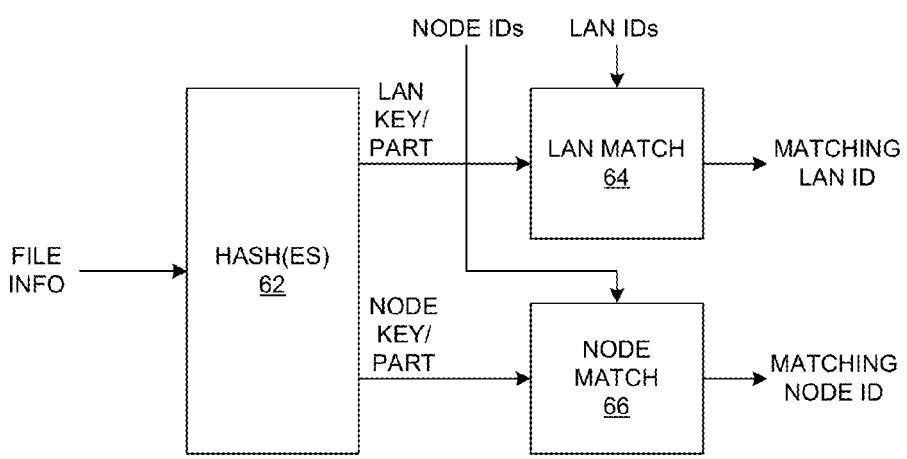
FIG. 8 is a block diagram describing a hash-based technique for identifying a LAN and a node for storing data.

FIG. 8 illustrates how the two-layer DHT is used to map a data file to a LAN 14 and node 22. File information is provided to hash function(s) 62 that operate(s) to generate a LAN key (shown as LAN KEY/PART) and a node key (shown as NODE KEY/PART). The LAN key is provided to a LAN matching function (LAN MATCH) 64, and the node key to a node matching function (NODE MATCH) 66. The matching functions 64, 66 also receive respective identifiers (LAN IDs, NODE IDs) that represent respective subspaces associated with the LANs or nodes respectively (e.g., they correspond to the starting hash values in FIGS. 6 and 7). The LAN IDs and node IDs may be generated by applying the same hash function(s) 62 to parameters or values that are unique to each LAN or node. In one embodiment, the LANs 14 are given serial LAN numbers as they join the overlay network; these can be hashed to generate corresponding LAN IDs. Nodes may have unique MAC addresses that can be hashed to generate corresponding node IDs. Each matching function 64, 66 calculates the identifier of the LAN or node whose key subspace contains the LAN or node key value respectively. These output values are shown as "matching LAN ID" and "matching node ID" in FIG. 8. Continuing with the above simplified example, the LAN match function 64 might compare the upper (most-significant) 4 bits of the LAN key to corresponding bits of the set of LAN IDs, and select as the matching LAN ID the one whose upper 4 bits match the upper 4 bits of the LAN key. The node matching function 66 might function similarly, except to use the upper 5 bits. It will be appreciated that this is a contrive example for illustration only, and that in a real system both the partitioning of the key space and the functioning of the LAN and node matching functions 64, 66 will generally be substantially more complex. Techniques are generally known in the art for realizing such matching functions 64, 66.

The terms LAN KEY/PART and NODE KEY/PART in FIG. 8 reflect the possibility that the LAN key and Node key may actually be separate parts of a single key value calculated by one hash function 62, assuming it can be assured that the separate parts are sufficiently independent to promote even usage of nodes 22 in LANs 14 as mentioned above. References to a LAN key and Node key are to understood as encompassing such key parts in such an embodiment.

Figure 9:
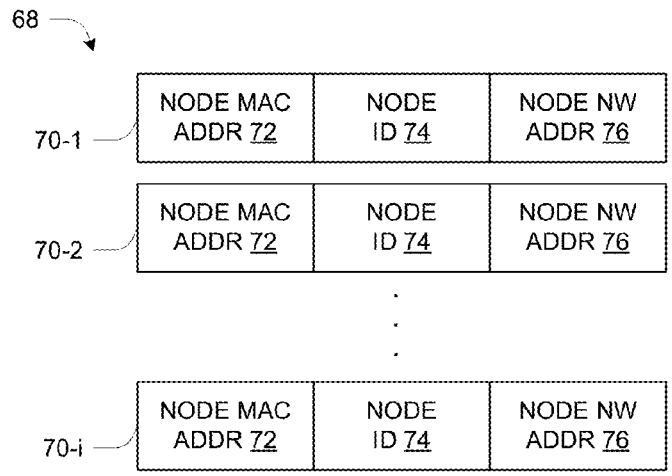
FIGS. 9-11 are schematic depictions of routing tables.
Figures 10, 11:
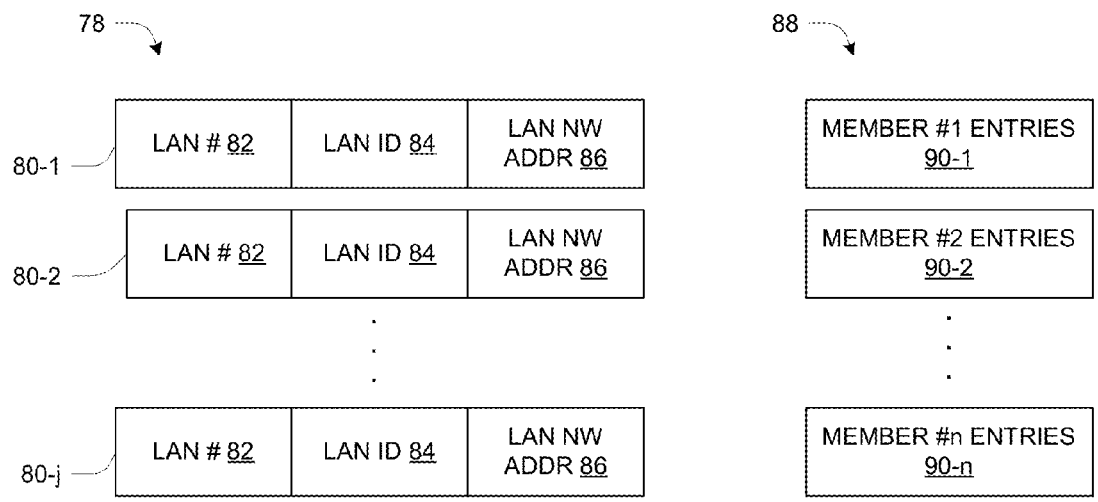

FIGS. 9-11 describe aspects of routing information that is maintained in the overlay network 10 and used to help identify a node 22 where data is located. The routing information is distributed among the nodes 22, and in particular it is distributed and accessed in a manner supported by the HCT structure.

FIG. 9 shows a LAN routing table 68 maintained by an LR node 26 of a LAN 14. The LAN routing table 68 includes a set of entries 70 (shown as 70-1, 70-2, . . . , 70-i), one for each node 22 of the LAN 14. The entry 70 for a given node has the node's MAC address 72, the node ID 74 (hash of MAC address as described above), and the node's physical-network address (NODE NW ADDR) 76, which in one embodiment can be an IP address for example. Each LR node 26 can build a LAN routing table 68 using information obtained during normal physical-network operations, as well as by itself calculating the hash of each member node's MAC address. The entries 70 may be ordered or otherwise organized according to the subspace partitioning as described with reference to FIG. 7, to facilitate a lookup operation in which a node ID is identified based on a node key. Alternatively, an LR 26 may employ a separate structure optimized for lookup whose contents are derived from the contents of the routing table 68, similar to techniques used in general network routing.

FIG. 10 shows a level-1 routing table 78 which is maintained by a cluster proxy (CP) node of a level-1 cluster. The level-1 routing table 78 includes a set of entries 80 (shown as 80-1, 80-2, . . . , 80-j), one for each member LAN 14 of the cluster 20. The entry 80 for a LAN has the LAN's LAN number (LAN #) 82, the LAN ID 84 (hash of LAN # as described above), and the physical-network address of the LR for the LAN (LAN NW ADDR) 86, which in one embodiment can be an IP address for example. A CP builds the level-1 routing table 78 using information obtained during initialization and maintenance operations of the overlay network. The entries 80 may be ordered or otherwise organized according to the subspace partitioning as described with reference to FIG. 6, to facilitate a lookup operation in which a LAN ID is identified based on a LAN key. A separate, derived lookup structure such as described above may also be employed.

FIG. 11 shows a level-n routing table 88 which is maintained by a CP node of a level-n cluster for n>1. The level-n routing table 88 includes sets of entries 90 (shown as 90-1, 90-2, . . . , 90-n), one set for each member or "child" cluster, and each set 90 includes some or all of the entries 80 of the level-1 routing tables of all clusters beneath this cluster in the HCT structure. For a level-2 cluster, the routing table 88 includes the entries 80 for the member level-1 clusters. For a level-3 cluster, the routing table 88 includes the sets of entries 90 for the member level-2 clusters, and thus the entries 80 for all level-1 clusters beneath the level-3 cluster in the HCT structure. This pattern is repeated for successively higher cluster levels to the root or top-level cluster, whose routing table ideally includes all the routing entries 80 for all LANs of the overlay network. It will be appreciated that for large networks, the higher-level routing tables may be quite large and therefore costly to store and use. This problem can be dealt with in a variety of ways. For example, storage and use of a routing table may be offloaded to one or more separate machines that can be operated in a load-balanced manner. Alternatively, a communications mechanism may be used to enable a higher-level cluster to request information from the routing tables of lower-level clusters as needed, so that the complete set of routing information need not be stored at the higher-level cluster.

The routing information in the various routing tables 68, 78 and 88 may come to be known in any of a variety of ways. Theoretically all this information could be configured by a network administrator, although this would clearly be impractical for any real network of any non-trivial size. More likely some technique of discovery is employed among the nodes 22. Such discovery may actually be part of a process by which the nodes 22 form themselves into the overlay network 10, which would involve measuring inter-node distances, creating clusters, joining clusters, becoming established as a LR or CP node, etc. To support routing as described herein, discovery should include learning LAN IDs and node IDs as well as underlying physical-network addresses (e.g., IP addresses) of nodes 22. For example, a CP node of a level-1 cluster needs to learn the physical-network addresses of the LR nodes 26 of the member LANs 14 of the cluster. Discovery techniques are generally known in the art and not elaborated further herein.

Figure 12:
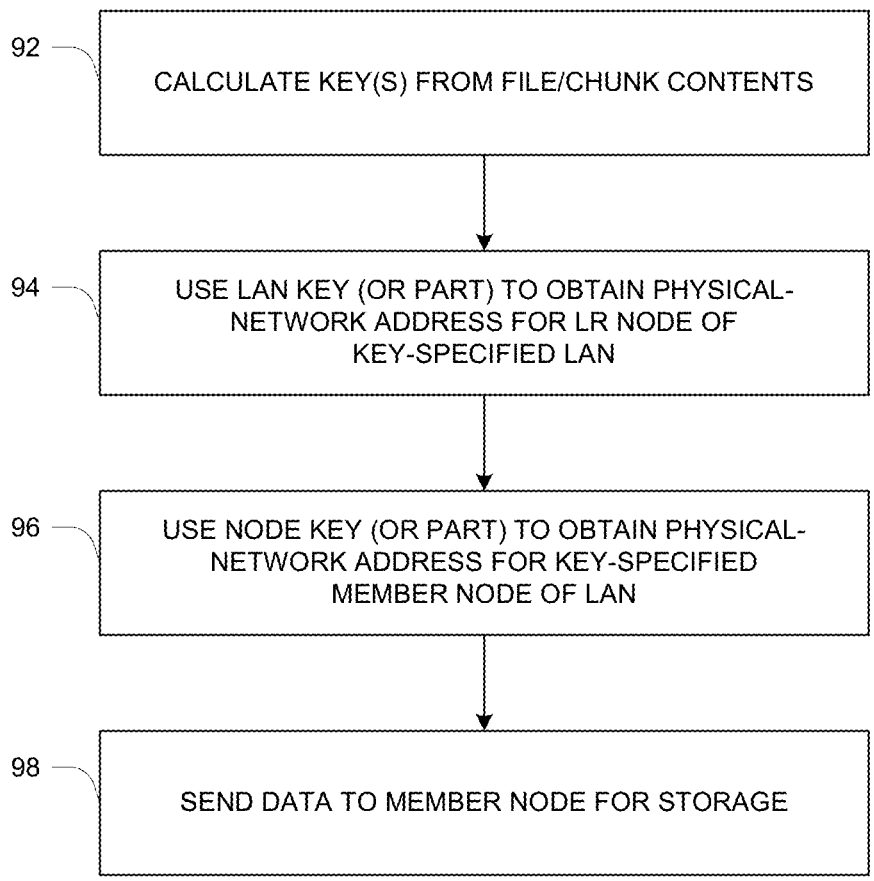
FIGS. 12-13 are flow diagrams describing routing-related operations.

FIG. 12 provides a high-level description of a process of storing a unit of data in the overlay network. In this description, the unit of data is assumed to be a file or a piece of a file referred to as a "chunk". Dividing files into chunks, referred to as "chunking", can be useful for a variety of purposes, especially in applications where it is necessary or preferable to handle data in fixed-sized units. Chunking can be used to transform variable-size data files into corresponding sets of fixed-size chunks (using padding with any remainder data as necessary). The process of FIG. 12 is described from the perspective of a node desiring to store the data, referred to as the "source" node. The node that receives the data for storage is referred to as the "target" node.

At 92, the source node calculates the LAN and Node hash keys for a file/chunk, which calculation may use some or all the file/chunk contents and/or separate metadata uniquely associated with the file/chunk. An example of file metadata is a fully qualified file name including a short file name (e.g., "example.dat") and a path prefix specifying a location of the file/chunk in a file system (e.g., \\network-name\username\project-name\task-name). This process corresponds to that described above with reference to FIG. 8.

At 94, the source node 94 uses the LAN key to obtain the physical-network address of the LR node 26 of the LAN 14 whose subspace contains the LAN key, referred to as the "key-specified" LAN. Details of this operation are given below.

At 96, the source node 94 uses the node key to obtain the physical-network address for a node 22 (of the key-specified LAN) whose subspace contains the node key. This node is referred to as the "key-specified" member node. Part of this operation includes contacting the LR node 26 of the key-specified LAN, which is done using the physical-network address obtained in 94.

At 98, the source node 94 uses the physical-network address obtained in 96 to send the data to the target node. Referring back to FIG. 4, in the operation the overlay part 44 creates one or more data storage messages and hands them to the physical network part 46 along with the physical-network address of the target node. The message is sent, forwarded, and received in the conventional manner using the physical-network components 42. Once received at the target node, it is delivered to the overlay part 44 of that node, which then stores the data locally.

In many applications, file metadata will be used to create and store file location information that can be used to locate a file in the network for reading, updating or deleting. A good example of file metadata is a fully qualified file name as described above. The location information will identify a set of one or more nodes of the overlay network where the file data is located. The mapping between file metadata and location information may be realized using a directory for example, and such a directory may be distributed among the nodes of the overlay network. Additionally, it may be convenient for the mapping between file metadata and the file location information to use be based on the same hash function(s) 62 used for the data itself. A node accessing a file/chunk can consult the directory to obtain the file location information, then contact the node(s) and LAN(s) specified in the file location information to obtain the file. If metadata hashing is used, the access to the directory may be as follows. The accessing node first calculates the hash of the metadata (e.g., file name & path) and performs an operation similar to 94 or 96 to obtain the physical-network address of a node where part or all of the file data is stored. If the data is distributed among multiple nodes, then the identities of those nodes may also be stored in the location information, or they can be derived algorithmically based on the location information. For example, if the nodes are logically ordered the location information may identify a first node and a number of successive nodes that the data is distributed across. In such a case, a sending node identifies the next two nodes in the order based its knowledge of the node ordering and the identity of the first node. Once the accessing node has the physical-network address of the node(s) storing the data, it sends one or more read request messages and receives returned data using the physical network in a manner similar for data storing operations as described above. In this operation, the overlay part 44 of the accessing node is a client of the physical network including the physical network part 46 of the same node.

Figure 13:
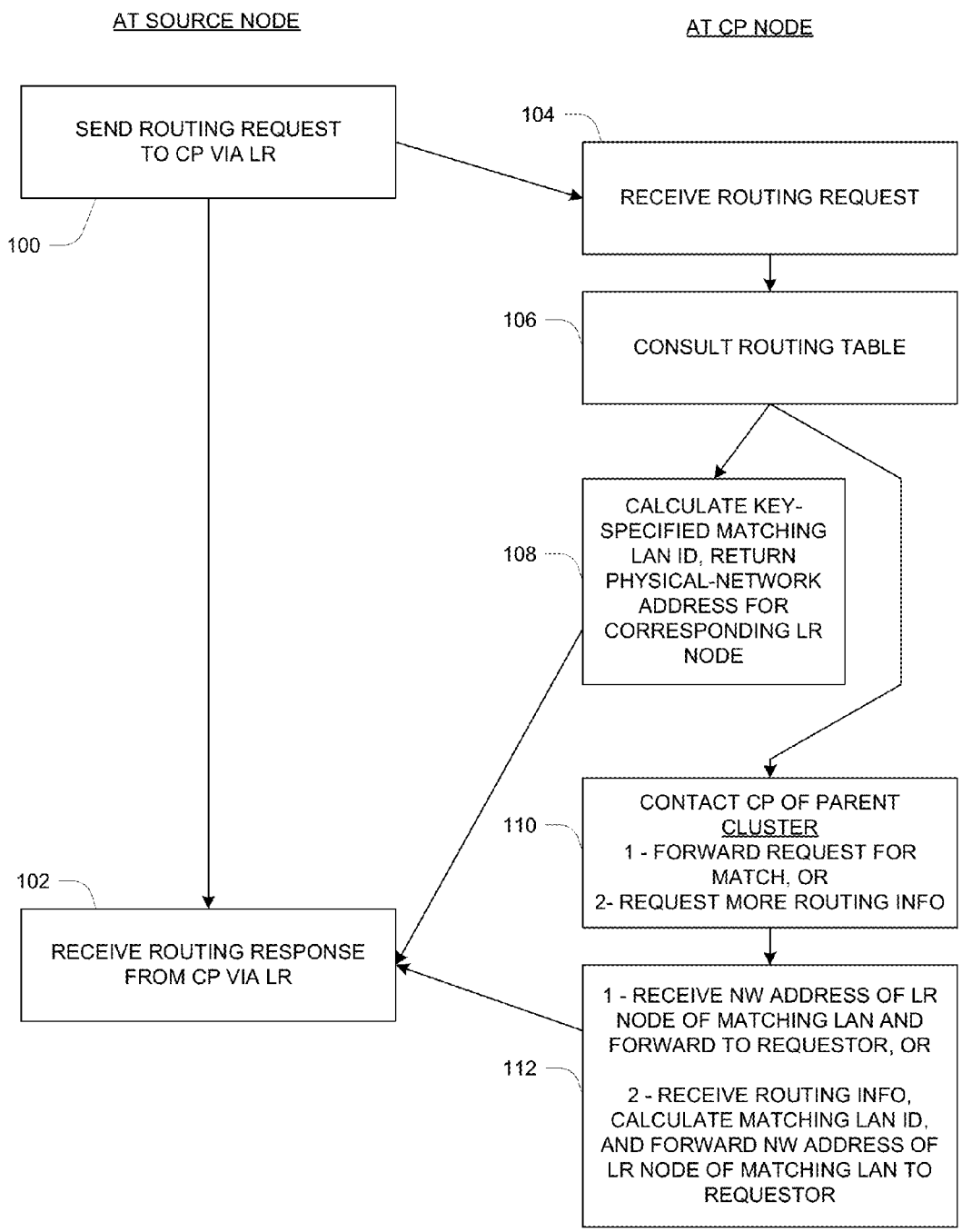

FIG. 13 illustrates the manner of obtaining a physical-network address of an LR node in step 94 of FIG. 12. Cooperation between the source node and a CP node of the level-1 cluster containing the source node is shown. The CP node is assumed to include a level-1 routing table 78 as in FIG. 10, while the LR node 26 of the LAN that includes the target node is assumed to include a LAN routing table 68 as shown in FIG. 9.

At 100, the source node sends a routing request message to the CP node via the LR node 26 of the LAN that contains the source node. That is, the source node issues the routing request message and directs it to the LR node 26, which forwards the request to the CP node. The source node then awaits receipt of a corresponding routing response message at 102. The routing response message includes the physical-network address of the LR node of the LAN specified by the key that was included in the routing request message. In a real system it may be necessary to make provision for error conditions, but such operations are omitted from this description for clarity.

Steps 104-112 are performed at the CP node in response to receiving the routing request from the source node. At 104 the CP node receives the routing request, and at 106 the CP node consults its routing table 78. Subsequent operation depends on whether or not the routing table 78 has sufficient information to enable the CP node to unambiguously calculate the matching LAN ID. This determination will be system-specific and may depend on the nature of the hash key space and mapping function. Most generally, calculating the one matching LAN ID may require having entries 80 for every LAN 14 of the network, but in some embodiments there may be separate information usable to establish that a match calculated from some sub-set of LAN IDs is globally correct. For example, if the CP node knows that the correct match will always satisfy a certain separate test (based on a mathematical distance measure, for example), then the CP node can apply the test to any candidate matches and proceed based on the result of the test.

Step 108 is performed when the CP node has sufficient information in its routing table 78 to calculate a match. The CP node calculates the matching LAN ID, which will also appear as the LAN id 84 in a contained in a corresponding entry 80 in the table 78 (FIG. 10). The CP node then returns a response message to the source node that includes the LAN physical-network address 86 of that entry 80.

Steps 110-112 are performed when the CP node does not have sufficient information in its routing table 78 to calculate a match. In that case, at 110 the CP node first contacts the CP node of its parent cluster (the level-2 cluster that contains this level-1 cluster as a child or member). For this purpose, the CP node maintains a communications channel to the CP node of the parent cluster, which serves with the routing table 78 as a source of routing information for reaching the LANs of the overlay network. As indicated in FIG. 13, the nature of this contact may vary in different embodiments. In one embodiment, the CP node may forward the routing request that it received from the source node to the CP node of the parent cluster. In a different embodiment, the CP node may instead generate a request for additional routing information that is either possessed by or at least accessible to the CP node of the parent cluster. In this case the additional routing information that is requested is that needed to give the level-1 CP node sufficient routing information to calculate the matching LAN ID, which as indicated above will generally vary in different embodiments.

At 112, the level-1 CP node receives a response from the CP node of the parent cluster and sends an appropriate response to the source node. For an embodiment of the first type in which the routing request has been forwarded to the CP node of the parent cluster, the level-1 CP node receives a response containing the physical-network address of the LR node 26 of the LAN whose LAN ID matches the LAN key of the request. It is assumed here that either the responding level-2 CP node or a CP node of a higher-level cluster had sufficient routing information to calculate the matching LAN ID 84 and return the corresponding LAN NW address 86. As noted above, in some cases it may be necessary to for requests to be forwarded as high as the top-level or root cluster. For an embodiment of the second type in which the level-1 CP node has requested additional routing information, the level-1 CP node receives the additional routing information and updates its routing table 78, then itself calculates the matching LAN ID 84 and returns the corresponding LAN NW address 86 to the source node.

It is to be understood that the hash-based mapping or association between a data item and a node does not necessarily mean that all or even any part of the data item is stored on the node. The node may be a first node of a group of nodes among which the data is distributed, as described above, or it may even be some type of indirection point containing a pointer to other node(s) on which the data item is located.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computerized device, comprising:
    becoming established as a cluster proxy node of a cluster in an overlay network, the overlay network being a hierarchical cluster tree (HCT) overlay network on an underlying physical network, the HCT overlay network including two or more successively higher levels of clusters of local area networks (LANs), each cluster at a given level including a respective subset of the LANs as member LANs separated from each other by no more than a respective level-specific distance in the physical network, the LANs being uniquely associated with corresponding sub-spaces of a key space defined in the overlay network;
    maintaining a routing table and respective channels to a parent cluster and one or more member LANs of the cluster, the routing table and channel to the parent cluster serving as sources of routing information for reaching the LANs of the overlay network, the routing information associating each LAN with a physical-network address of a corresponding LAN representative node of the LAN, the routing table including at least that portion of the routing information that associates each member LAN of the cluster with the physical-network address of a corresponding LAN representative node; and
    in response to receiving routing request messages from nodes of the member LANs of the cluster, each routing request message including a respective key value from the key space of the overlay network, returning corresponding routing response messages each including physical-network address information from the routing table and/or the parent cluster, the physical-network address information of each routing response message including a physical-network address of a LAN representative node of a request-specific LAN whose associated sub-space contains the key value included in the corresponding routing request message,
    wherein the overlay network employs a two-level distributed hash table (DHT) organization for distributed storage of data items, the two-level DHT organization including separate LAN-level and node-level hash functions defining respective key spaces, the LAN-level key space containing the key values carried by the routing request messages,
    and wherein, for each cluster at a given level, the level-specific distance is a maximum hop count equal to a maximum number of routers along a shortest path in the physical network between any pair of the LANs of the cluster.

2. A method according to claim 1, wherein clusters at successively higher levels employ successively greater level-specific distances establishing maximum separation among the member LANs of the respective clusters.

3. A method according to claim 1, further including the steps, performed in response to receiving each routing request message, of:
performing a lookup operation in the routing table using the key contained in the routing request message;
in the case that the lookup operation unambiguously identifies the request-specific LAN, then obtaining the physical-network address information for the request-specific LAN from the routing table and returning it to a requesting node; and
in the case that the lookup operation does not unambiguously identify the request-specific LAN, then utilizing the channel to the parent cluster to obtain the physical-network address information for the request-specific LAN and returning it to the requesting node.

4. A method according to claim 3, wherein the lookup operation includes executing a matching function between the key contained in the routing request message and LAN identifiers in the routing table.

5. A method according to claim 3, wherein the routing request message is a received routing request message, and wherein utilizing the channel to the parent cluster includes:
sending an outgoing routing request message on the channel, the outgoing routing request message including the key value from the received routing request message; and
receiving a response message on the channel in response to the outgoing routing request message, the response message containing the physical-network address information.

6. A method according to claim 3, wherein utilizing the channel to parent cluster includes sending a routing information request message on the channel and receiving a corresponding routing information response message from the channel, the routing information request message requesting additional routing information not in the routing table but available from the parent cluster, the routing information response message including the additional routing information, and further including using the additional routing information to unambiguously identify the request-specific LAN and obtain the physical-layer network address for return to the requesting node.

7. A method according to claim 6, wherein the additional routing information returned in the routing information response message is routing information from a routing table of a cluster proxy node of the parent cluster.

8. A method according to claim 1, wherein the parent cluster provides access to routing information for sibling clusters being member clusters of the parent cluster.

9. A method according to claim 8, further including:
receiving a routing information request message from the parent cluster for routing information for the member LANs; and
in response to the routing information request message, obtaining routing information for the member LANs from the routing table and returning it to the parent cluster.

10. A computerized device, comprising:
instruction processing circuitry;
memory;
input/output circuitry; and
interconnect circuitry providing data connections among the instruction processing circuitry, memory, and input/output circuitry,
the memory storing a set of computer instructions executable by the instruction processing circuitry to cause the computerized device to perform a method including:
becoming established as a cluster proxy node of a cluster in an overlay network, the overlay network being a hierarchical cluster tree (HCT) overlay network on an underlying physical network, the HCT overlay network including two or more successively higher levels of clusters of local area networks (LANs), each cluster at a given level including a respective subset of the LANs as member LANs separated from each other by no more than a respective level-specific distance in the physical network, the LANs being uniquely associated with corresponding sub-spaces of a key space defined in the overlay network;
maintaining a routing table and respective channels to a parent cluster and one or more member LANs of the cluster, the routing table and channel to the parent cluster serving as sources of routing information for reaching the LANs of the overlay network, the routing information associating each LAN with a physical-network address of a corresponding LAN representative node of the LAN, the routing table including at least that portion of the routing information that associates each member LAN of the cluster with the physical-network address of a corresponding LAN representative node; and
in response to receiving routing request messages from nodes of the member LANs of the cluster, each routing request message including a respective key value from the key space of the overlay network, returning corresponding routing response messages each including physical-network address information from the routing table and/or the parent cluster, the physical-network address information of each routing response message including a physical-network address of a LAN representative node of a request-specific LAN whose associated sub-space contains the key value included in the corresponding routing request message,
wherein the overlay network employs a two-level distributed hash table (DHT) organization for distributed storage of data items, the two-level DHT organization including separate LAN-level and node-level hash functions defining respective key spaces, the LAN-level key space containing the key values carried by the routing request messages,
and wherein, for each cluster at a given level, the level-specific distance is a maximum hop count equal to a maximum number of routers along a shortest path in the physical network between any pair of the LANs of the cluster.

11. A computerized device according to claim 10, wherein clusters at successively higher levels employ successively greater level-specific distances establishing maximum separation among the member LANs of the respective clusters.

12. A computerized device according to claim 10, wherein the method performed by the computerized device further includes the steps, performed in response to receiving each routing request message, of:
performing a lookup operation in the routing table using the key contained in the routing request message;
in the case that the lookup operation unambiguously identifies the request-specific LAN, then obtaining the physical-network address information for the request-specific LAN from the routing table and returning it to a requesting node; and in the case that the lookup operation does not unambiguously identify the request-specific LAN, then utilizing the channel to the parent cluster to obtain the physical-network address information for the request-specific LAN and returning it to the requesting node.

13. A computerized device according to claim 12, wherein the lookup operation includes executing a matching function between the key contained in the routing request message and LAN identifiers in the routing table.

14. A computerized device according to claim 12, wherein the routing request message is a received routing request message, and wherein utilizing the channel to the parent cluster includes:

sending an outgoing routing request message on the channel, the outgoing routing request message including the key value from the received routing request message; and receiving a response message on the channel in response to the outgoing routing request message, the response message containing the physical-network address information.

15. A computerized device according to claim 12, wherein utilizing the channel to parent cluster includes sending a routing information request message on the channel and receiving a corresponding routing information response message from the channel, the routing information request message requesting additional routing information not in the routing table but available from the parent cluster, the routing information response message including the additional routing information, and further including using the additional routing information to unambiguously identify the request-specific LAN and obtain the physical-layer network address for return to the requesting node.

16. A computerized device according to claim 15, wherein the additional routing information returned in the routing information response message is routing information from a routing table of a cluster proxy node of the parent cluster.

17. A computerized device according to claim 10, wherein the parent cluster provides access to routing information for sibling clusters being member clusters of the parent cluster.

18. A computerized device according to claim 17, wherein the method performed by the computerized device further includes:

receiving a routing information request message from the parent cluster for routing information for the member LANs; and in response to the routing information request message, obtaining routing information for the member LANs from the routing table and returning it to the parent cluster.

19. A method according to claim 1, wherein the LAN-level and node-level hash functions of the two-level DHT organization are either (1) two distinct and mutually independent hash functions, a first hash function generating a LAN hash value and defining the LAN-level key space, a second hash function generating a node hash value and defining a node-level key space having key values mapped to nodes of the overlay network, or (2) one hash function operating on two distinct sets of input data to generate the LAN hash value and node hash value respectively.

20. A computerized device according to claim 10, wherein the LAN-level and node-level hash functions of the two-level DHT organization are either (1) two distinct and mutually independent hash functions, a first hash function generating a LAN hash value and defining the LAN-level key space, a second hash function generating a node hash value and defining a node-level key space having key values mapped to nodes of the overlay network, or (2) one hash function operating on two distinct sets of input data to generate the LAN hash value and node hash value respectively.

* * * * *